United States Patent
Liu et al.

(10) Patent No.: US 9,658,745 B1
(45) Date of Patent: May 23, 2017

(54) PRESENTATION OF NON-INTERRUPTING CONTENT ITEMS

(71) Applicant: Google Inc., Mountain View, CA (US)

(72) Inventors: Yifang Liu, Redwood City, CA (US); Zhenyu Liu, San Jose, CA (US); Roberto Javier Bayardo, San Jose, CA (US); Mayur Dhondu Datar, Sunnyvale, CA (US); Allen Pin-Hsiu Huang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/286,970

(22) Filed: Oct. 6, 2016

Related U.S. Application Data

(63) Continuation of application No. 13/797,146, filed on Mar. 12, 2013, now Pat. No. 9,473,560.

(51) Int. Cl.
*G06F 3/0484* (2013.01)
*G06F 3/0482* (2013.01)
*G06F 17/21* (2006.01)

(52) U.S. Cl.
CPC .......... *G06F 3/0482* (2013.01); *G06F 17/212* (2013.01)

(58) Field of Classification Search
CPC .......... G06F 3/00; G06F 3/048; G06F 3/0481; G06F 3/0482; G06F 3/0484; G06F 9/4443; G06F 17/30884; G06F 17/24; G06F 17/30; G06F 17/30017; G06F 17/30067; G06F 17/30286; G06F 17/30554; G06F 17/30864; G06F 17/30867; G06F 17/30873; G06F 17/30882; H04L 29/06; H04L 29/0809; H04L 29/08072; G06Q 10/10; H04N 5/44543; G11B 27/00; G11B 27/10; G11B 27/28; G11B 27/034; G11B 27/34
See application file for complete search history.

(56) References Cited

U.S. PATENT DOCUMENTS

| | | |
|---|---|---|
| 6,486,891 B1 | 11/2002 | Rice |
| 2005/0096979 A1 | 5/2005 | Koningstein |

(Continued)

OTHER PUBLICATIONS

Ad Keeper Self-Serve, web page, retrieved Mar. 12, 2013, 1 page, http://www.adkeeper.com.

(Continued)

*Primary Examiner* — Xiomar L Bautista
(74) *Attorney, Agent, or Firm* — Foley & Lardner LLP; John D. Lanza

(57) ABSTRACT

A method for enabling a user of a computing device to designate a content item for subsequent review is provided. The computing device is coupled to a memory device and a display. The method is implemented using the computing device. The method includes displaying, by the computing device, a first publication. The method further includes the steps of displaying, by the computing device, a content item at a first time, wherein the content item is displayed in conjunction with the first publication. The method further includes receiving, by the computing device, a first input from the user to designate the content item for subsequent review, generating an indicator that the content item has been designated for subsequent review, causing the memory device to store the indicator, determining a second time to display the content item, and displaying the content item at the second time.

20 Claims, 12 Drawing Sheets

(56) References Cited

U.S. PATENT DOCUMENTS

| | | |
|---|---|---|
| 2009/0019372 A1 | 1/2009 | Chu et al. |
| 2012/0072272 A1* | 3/2012 | Kilar .................... G06Q 30/02 |
| | | 705/14.4 |
| 2012/0278173 A1 | 11/2012 | Vaidyanathan et al. |
| 2012/0328263 A1 | 12/2012 | Barton et al. |
| 2013/0013409 A1 | 1/2013 | Walmer |
| 2013/0139078 A1 | 5/2013 | Chuang et al. |
| 2013/0304828 A1* | 11/2013 | Robertson ............ H04L 65/403 |
| | | 709/206 |

OTHER PUBLICATIONS

Notice of Allowance on U.S. Appl. No. 13/797,146 dated Jun. 22, 2016.
Office Action on U.S. Appl. No. 13/797,146 dated Feb. 12, 2016.
Office Action on U.S. Appl. No. 13/797,146 dated Jul. 31, 2015.

\* cited by examiner

PRESENTATION OF NON-INTERRUPTING CONTENT ITEMS

CROSS-REFERENCE TO RELATED PATENT APPLICATIONS

This application claims priority and is a continuation of U.S. patent application Ser. No. 13/797,146, filed on Mar. 12, 2013, entitled "PRESENTATION OF NON-INTERRUPTING CONTENT ITEMS" which is hereby incorporated by reference herein in its entirety.

BACKGROUND

This description relates to presenting one or more content items on a computing device, and more particularly, to enabling a user of a computing device to designate one or more content items presented to the user for later review.

Due to the limited screen size of a typical mobile computing device, applications and web pages are commonly designed to occupy the entire screen of the mobile computing device. That is, there generally is not enough space on the screen to present multiple applications and/or web pages to a user in a useful manner. As a result, the user's attention is focused on one application, web page, or other item at a time.

A typical scenario that occurs as a result of the limited screen size of a mobile computing device is that a user of the mobile computing device is using an application or is viewing a web page (a "publication") and is presented with a content item, for example an advertisement, embedded in the application or web page. The user might be interested in the content item and any content linked to the content item. In such a scenario, the user is faced with a dilemma. On one hand, the user may continue viewing the publication, thereby effectively dismissing the content item and potentially forgetting about the possibility of viewing the content item at a later time. On the other hand, the user may completely stop viewing the publication in order to investigate the content item. That is, the user may click on the content item, which causes the user's computing device to display additional content that the content item links to ("linked content"). As a result, the user is completely diverted away from the publication. That is, the linked content associated with the content item, when displayed, occupies the entire screen of the mobile computing device. Accordingly, as a result of the screen size of mobile computing devices, content items and linked content that may be of interest is often ignored and forgotten by the user.

BRIEF DESCRIPTION OF EXAMPLE EMBODIMENTS

In one aspect, a method for enabling a user of a computing device to designate a content item for subsequent review is provided. The computing device is coupled to a memory device and a display. The method is implemented using the computing device. The method includes displaying, by the computing device, a first publication. The method further includes the steps of displaying, by the computing device, a content item at a first time, wherein the content item is displayed in conjunction with the first publication. The method further includes receiving, by the computing device, a first input from the user to designate the content item for subsequent review, generating an indicator that the content item has been designated for subsequent review, causing the memory device to store the indicator, determining a second time to display the content item, and displaying the content item at the second time.

In another aspect, a computing device for enabling a user of the computing device to designate a content item for subsequent review is provided. The computing device includes a processor, a memory device coupled to the processor, a display coupled to the processor, and a computer-readable storage device coupled to the processor. The computer-readable storage device contains processor-executable instructions that, when executed by the processor, cause the computer system to perform the steps of displaying a first publication, displaying a content item at a first time, wherein the content item is displayed in conjunction with the first publication, receiving a first input from the user to designate the content item for subsequent review, generating an indicator that the content item has been designated for subsequent review, causing the memory device to store the indicator, determining a second time to display the content item, and displaying the content item at the second time.

In another aspect, a computer-readable storage device having processor-executable instructions embodied thereon, for enabling a user of a computing device to designate a content item for subsequent review is provided. The computing device includes at least one processor, a memory device coupled to the processor, and a display coupled to the processor. When executed by the computing device, the processor-executable instructions cause the computing device to perform the steps of displaying a first publication, displaying a content item at a first time, wherein the content item is displayed in conjunction with the first publication, receiving a first input from the user to designate the content item for subsequent review, generating an indicator that the content item has been designated for subsequent review, causing the memory device to store the indicator, determining a second time to display the content item, and displaying the content item at the second time.

In another aspect, a method for enabling a user of a first computing device to designate a content item for subsequent review is provided. The method is performed by a second computing device communicatively coupled to the first computing device. The second computing device is coupled to a memory device containing at least one content item. The method includes receiving, by the second computing device, a content item request from the first computing device at a first time, selecting a content item from the memory device in response to the request, transmitting the selected content item to the first computing device, receiving an instruction from the first computing device to store an indicator designating the selected content item for subsequent review, storing the indicator in the memory device, determining a second time to transmit the selected content item to the first computing device, and transmitting the selected content item to the first computing device at the second time.

In another aspect, a first computing device for enabling a user of a second computing device to designate a content item for subsequent review is provided. The first computing device includes a processor, a memory device coupled to the processor and containing at least one content item, and a computer-readable storage device coupled to the processor. The computer-readable storage device contains processor-executable instructions that, when executed by the processor, cause the first computer system to perform the steps of: receiving a content item request from the second computing device at a first time, selecting a content item from the memory device in response to the request, transmitting the selected content item to the second computing device, receiving an instruction from the second computing device to store an indicator designating the selected content item for subsequent review, storing the indicator in the memory device, determining a second time to transmit the selected content item to the first computing device, and transmitting the selected content item to the first computing device at the second time.

In another aspect, a computer-readable storage device having processor-executable instructions embodied thereon, for enabling a user of a first computing device to designate a content item for subsequent review is provided. When executed by a second computing device having at least one processor, a memory device coupled to the processor and containing at least one content item, and a display coupled to the processor, the processor-executable instructions cause the second computing device to perform the steps of: receiving a content item request from the first computing device at a first time, selecting a content item from the memory device in response to the request, transmitting the selected content item to the first computing device, receiving an instruction from the first computing device to store an indicator designating the selected content item for subsequent review, storing the indicator in the memory device, determining a second time to transmit the selected content item to the first computing device, and transmitting the selected content item to the first computing device at the second time.

In another aspect, a system for enabling a user of the system to designate a content item for subsequent review is provided. The system includes means for displaying a first publication. The system additionally includes means for displaying a content item at a first time, wherein the content item is displayed in conjunction with the first publication. Additionally, the system includes means for receiving a first input from the user to designate the content item for subsequent review, means for generating an indicator that the content item has been designated for subsequent review, means for storing the indicator, means for determining a second time to display the content item, and means for displaying the content item at the second time.

In another aspect, a system as described above is provided, wherein the system further includes means for removing the content item from a display in response to receiving the first input from the user to designate the content item for subsequent review.

In another aspect, a system as described above is provided, wherein the system further includes means for receiving a second input from the user to display a list of content items designated for subsequent review and means for retrieving the content item designated for subsequent review.

In another aspect, a system as described above is provided, wherein the means for receiving the second input from the user includes means for receiving an instruction from the user to close an application or web page displaying the first publication.

In another aspect, a system as described above is provided, wherein the system further includes means for receiving a selection input from the user selecting the content item and means for displaying linked content associated with the selected content item.

In another aspect, a system as described above is provided, wherein the system further includes means for generating a first request for the content item, means for transmitting the first request to a computing device, and means for receiving the content item from the computing device.

In another aspect, a system as described above is provided, wherein the means for determining the second time to display the content item includes means for determining the second time to display the content item based on at least one of an elapsed time between the first time and the second time, a subject matter of the content item, a subject matter of the first publication, information pertaining to a publisher of the first publication, a subject matter of a second publication displayed by the system, an interest of the user, a location of the user, location information associated with the content item, and a number of times that the content item has been designated for subsequent review.

In another aspect, a system as described above is provided, wherein the means for displaying the content item at the first time further includes means for displaying the content item at the first time in a first application and wherein the means for displaying the content item at the second time further includes means for displaying the content item in at least one of a gallery of images, a notifications tray, and a second application that is different from the first application.

In another aspect, a system for enabling a user of a first computing device to designate a content item for subsequent review is provided. The system comprises means for receiving a content item request from the first computing device at a first time. The system additionally includes means for selecting a content item from a memory device in response to the request. Additionally, the system includes means for transmitting the selected content item to the first computing device, means for receiving an instruction from the first computing device to store an indicator designating the selected content item for subsequent review, means for storing the indicator in the memory device, means for determining a second time to transmit the selected content item to the first computing device, and means for transmitting the selected content item to the first computing device at the second time.

The features, functions, and advantages described herein may be achieved independently in various embodiments of the present disclosure or may be combined in yet other embodiments, further details of which may be seen with reference to the following description and drawings.

Figure 1:
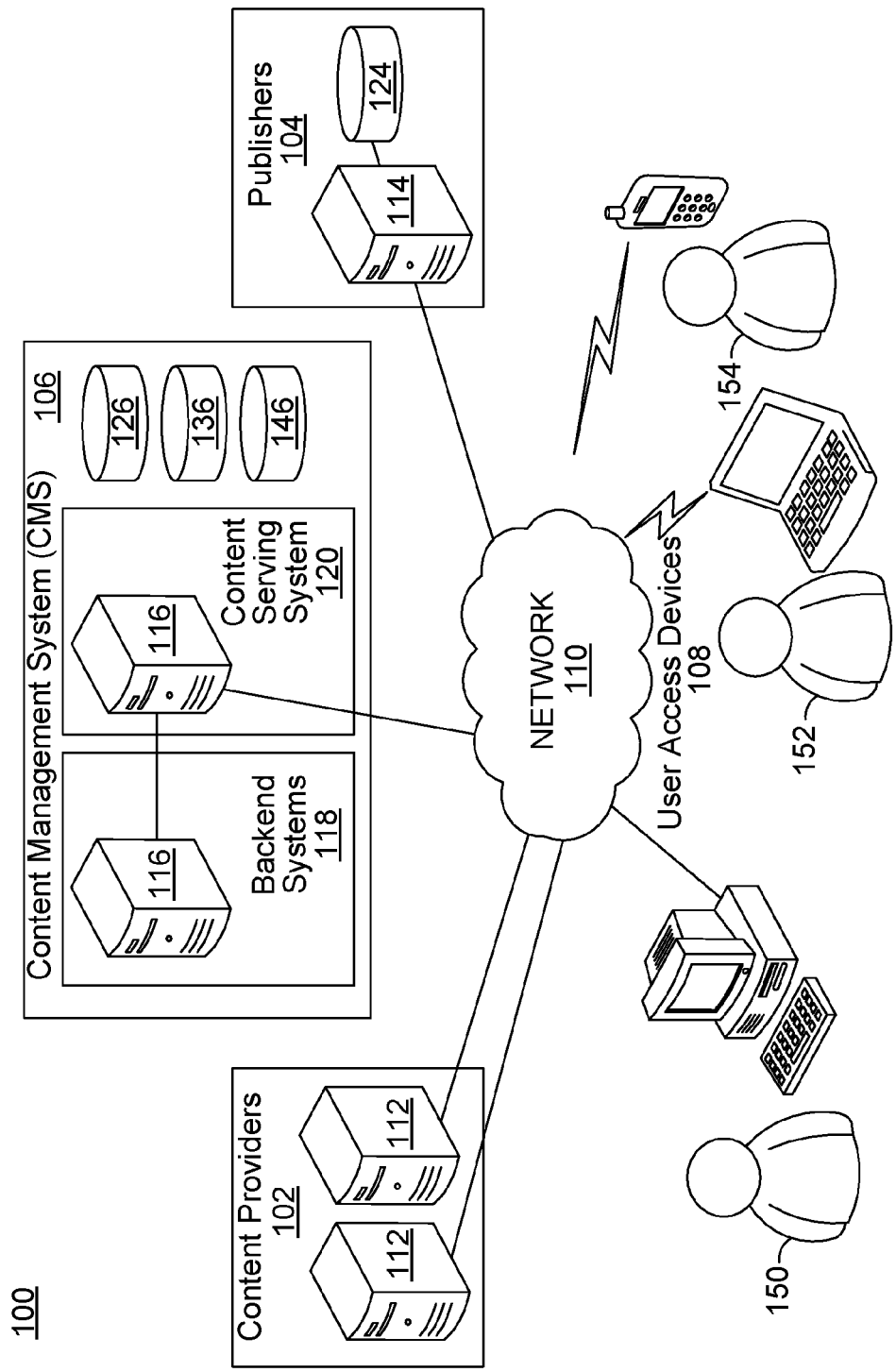
FIG. 1 is a diagram depicting an example networked environment.

Although specific features of various embodiments may be shown in some drawings and not in others, this is for convenience only. Any feature of any drawing may be referenced and/or claimed in combination with any feature of any other drawing.

DETAILED DESCRIPTION

The following detailed description of implementations refers to the accompanying drawings. The same reference numbers in different drawings may identify the same or similar elements. Also, the following detailed description does not limit the claims.

This subject matter described herein relates generally to collecting information to facilitate the serving of content items to a user. Specifically, the methods and systems described herein enable a user viewing a publication on a computing device to designate one or more content items, for example advertisements associated with goods or services, for subsequent review. That is, methods and systems herein facilitate displaying a content item, receiving an input from the user to designate the content item for subsequent review, removing the content item from the display, and reminding the user of and/or presenting the user with the content item at a subsequent time.

In situations in which the systems discussed herein collect personal information about users, or may make use of personal information, the users may be provided with an opportunity to control whether programs or features collect user information (e.g., a user's preferences, interests, profession, activities, and/or location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as a city, a ZIP code, or state level), so that a particular location of a user cannot be determined. Thus, the user may have control over how information is collected about the user and used by a content server.

As used herein, an element or step recited in the singular and proceeded with the word "a" or "an" should be understood as not excluding plural elements or steps, unless such exclusion is explicitly recited. Furthermore, references to "one embodiment" of the subject matter disclosed herein are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effects may include at least one of: (a) displaying, by a computing device, a first publication; (b) displaying, by the computing device, a content item at a first time, wherein the content item is displayed in conjunction with the first publication; (c) receiving, by the computing device, a first input from the user to designate the content item for subsequent review; (d) generating an indicator that the content item has been designated for subsequent review; (e) causing a memory device to store the indicator; (f) determining a second time to display the content item; and (g) displaying the content item at the second time.

FIG. 1 is a diagram depicting an example networked environment. With reference to FIG. 1, an example networked environment 100 may include one or more content providers 102, one or more publishers 104, a content management system (CMS) 106, and one or more user access devices 108, which may be coupled to a network 110. User access devices are used by users 150, 152, and 154. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with general purpose servers, software processes and engines, and/or various embedded systems. The elements 102, 104, 106 and 110 may serve, for example, as a content distribution network.

The content providers 102 may include any entities that are associated with content. In some embodiments, the content includes any form of communication in which one or more products, services, ideas, messages, people, organizations or other items are identified and promoted (or otherwise communicated). Content is not limited to advertisements and commercial promotions. Rather, content may additionally or alternatively include public service announcements or any other types of notices, such as public notices published in printed or electronic press or broadcasts.

Content may be communicated via various mediums and in various forms. In some examples, content may be communicated through an interactive medium, such as the Internet, and may include graphical content (e.g., banner content), textual content, image content, audio content, video content, content combining one of more of any of such components, or any form of electronically delivered content. Content may include embedded information, such as embedded media, links, meta-information, and/or machine executable instructions. Content could also be communicated through RSS (Really Simple Syndication) feeds, radio channels, television channels, print media, and other media.

Content can refer to both a single "creative" and a "content group." A creative refers to any entity that represents one content impression. A content impression refers to any form of presentation of content such that it is viewable/receivable by a user. In some examples, a content impression may occur when content is displayed on a display device of a user access device. A content group refers, for example, to an entity that represents a group of creatives that share a common characteristic, such as having the same content selection and recommendation criteria. Content groups can be used to create a content campaign.

The content providers 102 may provide (or be otherwise associated with) products and/or services related to content. The content providers 102 may include or be associated with, for example, retailers, wholesalers, warehouses, manufacturers, distributors, health care providers, educational establishments, financial establishments, technology providers, energy providers, utility providers, or any other product or service providers or distributors.

The content providers 102 may directly or indirectly generate, maintain, and/or track content, which may be related to products or services offered by or otherwise associated with the content providers 102. The content providers 102 may include or maintain one or more data processing systems 112, such as servers or embedded systems, coupled to the network 110. The content providers 102 may include or maintain one or more processes that run on one or more data processing systems.

The publishers 104 may include any entities that generate, maintain, provide, present and/or otherwise process publications in the environment 100. "Publishers," in particular, include authors of publications, wherein authors may be individual persons, or, in the case of works made for hire, the proprietor(s) who hired the individual(s) responsible for creating the online publications. The term "publication" refers to various types of web-based, software application-based and/or otherwise presented information, including articles, discussion threads, reports, analyses, financial statements, music, video, graphics, search results, web page listings, information feeds (e.g., RSS feeds), television broadcasts, radio broadcasts, printed information, or any other form of information that may be presented to a user using a computing device such as one of user access devices 108.

In some implementations, the publishers 104 may include publishers with an Internet presence, such as online publication and news providers (e.g., online newspapers, online magazines, television websites, etc.), online service providers (e.g., financial service providers, health service providers, etc.), and the like. The publishers 104 can include software application providers, television broadcasters, radio broadcasters, satellite broadcasters, and other providers of publications. One or more of the publishers 104 may represent a publication network that is associated with the CMS 106.

The publishers 104 may receive requests from the user access devices 108 (or other elements in the environment 100) and provide or present publications to the requesting devices. The publishers may provide or present publications via various mediums and in various forms, including web based and non-web based mediums and forms. The publishers 104 may generate and/or maintain such publications and/or retrieve the publications from other network resources.

In addition to publications, the publishers 104 may be configured to integrate or combine retrieved publications with content that is related or relevant to the retrieved publication for display to users 150, 152, and 154. As discussed further below, the relevant content may be provided from the CMS 106 and may be combined with a publication for display to users 150, 152, and 154. In some examples, the publishers 104 may retrieve a publication for display on a particular user access device 108 and then forward the publication to the user access device 108 along with code that causes content from the CMS 106 to be displayed to the user 150, 152, or 154. In other examples, the publishers 104 may retrieve a publication, retrieve relevant content (e.g., from the CMS 106 or the content providers 102), and then integrate the content and the publication to form a page for display to the user 150, 152, or 154.

As noted above, one or more of the publishers 104 may represent a publication network. In such an implementation, the content providers 102 may be able to present ads to users through this publication network.

The publishers 104 may include or maintain one or more data processing systems 114, such as servers or embedded systems, coupled to the network 110. They may include or maintain one or more processes that run on data processing systems. In some examples, the publishers 104 may include one or more publication repositories 124 for storing publications and other information.

The CMS 106 manages content and provides various services to the content providers 102, the publishers 104, and the user access devices 108. The CMS 106 may store content in a content repository 126 and facilitate the distribution or selective provision and recommendation of content through the environment 100 to the user access devices 108. In some configurations, the CMS 106 may include or access functionality associated with the AdWords™, AdSense™, and/or AdMob™ systems provided by Google Inc. (Mountain View, Calif.).

The CMS 106 may include one or more data processing systems 116, such as servers or embedded systems, coupled to the network 110. It can also include one or more processes, such as server processes. In some examples, the CMS 106 may include a content serving system 120 and one or more backend processing systems 118. The content serving system 120 may include one or more data processing systems 116 and may perform functionality associated with delivering content to publishers or user access devices 108. The backend processing systems 118 may include one or more data processing systems 116 and may perform functionality associated with identifying relevant content to deliver, processing various rules, performing filtering processes, generating reports, maintaining accounts and usage information, and other backend system processing. The CMS 106 can use the backend processing systems 118 and the content serving system 120 to selectively recommend and provide relevant content from the content providers 102 through the publishers 104 to the user access devices 108.

The CMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publications, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query.

The CMS 106 may include one or more interface or frontend modules for providing the various features to content providers, publishers, and user access devices. For example, the CMS 106 may provide one or more publisher front-end interfaces (PFEs) for allowing publishers to interact with the CMS 106. The CMS 106 may also provide one or more content provider front-end interfaces (CPFEs) for allowing content providers to interact with the CMS 106. In some examples, the front-end interfaces may be configured as web applications that provide users with network access to features available in the CMS 106.

The CMS 106 provides various content management features to the content providers 102. In some examples, the CMS 106 may include features for content providers similar to those in the AdWords™ system provided by Google Inc. The CMS 106 features may allow users to set up user accounts, set account preferences, create content, select keywords for content, create campaigns or initiatives for multiple products or businesses, view reports associated with accounts, analyze costs and return on investment, selectively identify customers in different regions, selectively recommend and provide content to particular publishers, analyze financial information, analyze content performance, estimate content traffic, access keyword tools, add graphics and animations to content, etc.

The CMS 106 may allow the content providers 102 to create content and input keywords for which the content will appear. In some examples, the CMS 106 may provide content to user access devices or publishers when keywords associated with that content are included in a user request or a requested publication. The CMS 106 may also allow the content providers 102 to set bids for content. A bid may represent the maximum amount a content provider is willing to pay for each content impression, user click-through of content or other interaction with content. A click-through can include any action a user takes to select content. The content providers 102 may also choose a currency and monthly budget.

The CMS 106 may also allow the content providers 102 to view information about content impressions, which may be maintained by the CMS 106. The CMS 106 may be configured to determine and maintain the number of content impressions relative to a particular website or keyword. The CMS 106 may also determine and maintain the number of click-throughs for content as well as the ratio of click-throughs to impressions.

The CMS 106 may also allow the content providers 102 to select and/or create conversion types for content. A "conversion" may occur when a user consummates a transaction related to given content. A conversion could be defined to occur when a user clicks on content, for example a specific content item, is referred to the content provider's web page, and consummates a purchase there before leaving that web page. In another example, a conversion could be defined as the display of content to a user and a corresponding purchase on the content provider's web page within a predetermined time (e.g., seven days). The CMS 106 may store conversion data and other information in a conversion data repository 136.

The CMS 106 may allow the content providers 102 to input description information associated with content. This information could be used to assist the publishers 104 in determining content to publish. The content providers 102 may additionally input a cost/value associated with selected conversion types, such as a five dollar credit to the publishers 104 for each product or service purchased.

The CMS 106 may provide various features to the publishers 104. In some examples, the CMS 106 may include features for publishers similar to those in the AdSense™ system provided by Google Inc. The CMS 106 may deliver content (associated with the content providers 102) to the user access devices 108 when users access publications from the publishers 104. The CMS 106 can be configured to deliver content that is relevant to publisher sites, publications, and publisher audiences.

In some examples, the CMS 106 may crawl publications provided by the publishers 104 and deliver content that is relevant to publisher sites, publications and publisher audiences based on the crawled publications. The CMS 106 may also selectively recommend and/or provide content based on user information and behavior, such as particular search queries performed on a search engine website, or a designation of content for subsequent review, as described herein, etc. The CMS 106 may store such information in a general database 146. In some examples, the CMS 106 can add search services (e.g., a Google™ search box) to a publisher site and deliver content configured to provide appropriate and relevant content relative to search results generated by requests from visitors of the publisher site. A combination of these and other approaches can be used to deliver relevant content.

The CMS 106 may allow the publishers 104 to search and select specific products and services as well as associated content to be displayed with publications provided by the publishers 104. For example, the publishers 104 may search through content in the content repository 126 and select certain content for display with their publications.

The CMS 106 may be configured to selectively recommend and provide content created by the content providers 102 to the user access devices 108 directly or through the publishers 104. The CMS 106 may selectively recommend and provide content to a particular publisher 104 (as described in further detail herein) or a requesting user access device 108 when a user requests search results or loads a publication from the publisher 104.

In some implementations, the CMS 106 may manage and process financial transactions among and between elements in the environment 100. For example, the CMS 106 may credit accounts associated with the publishers 104 and debit accounts of the content providers 102. These and other transactions may be based on conversion data, impressions information and/or click-through rates received and maintained by the CMS 106.

"Computing devices", for example user access devices 108, may include any devices capable of receiving information from the network 110. The user access devices 108 could include general computing components and/or embedded systems optimized with specific components for performing specific tasks. Examples of user access devices include personal computers (e.g., desktop computers), mobile computing devices, cell phones, smart phones, head-mounted computing devices, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed content providers 102, publishers 104 and/or user access devices 108, which may be discrete, integrated modules or distributed systems. Similarly, the environment 100 is not limited to a single CMS 106 and may include any number of integrated or distributed CMS systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes running on separate machines or a single process running on a single machine.

Figure 2:
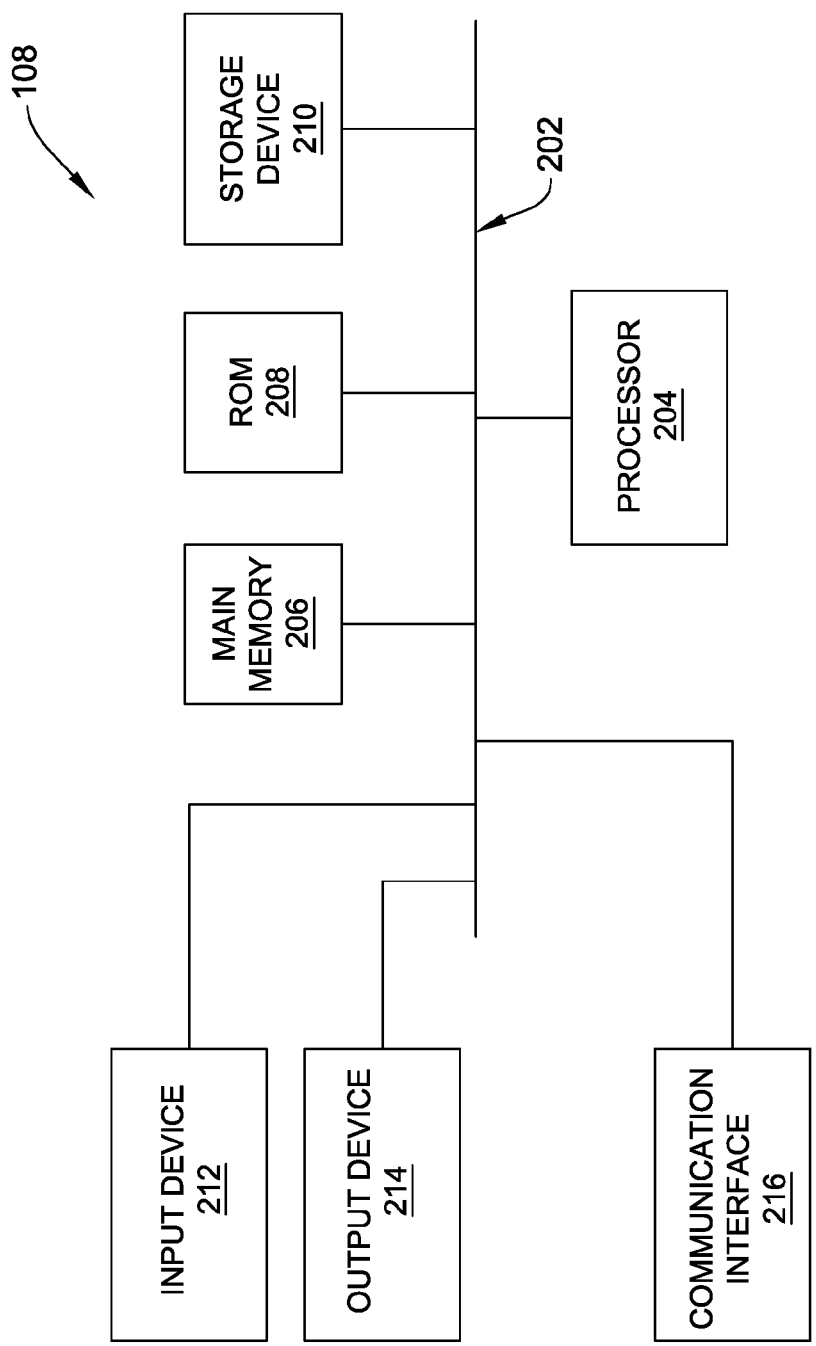
FIG. 2 is a diagram of an example computing device for designating a content item for subsequent review in accordance with an embodiment.

FIG. 2 is a block diagram of a computing device, for example a user access device 108 (FIG. 1). Computing device 108 may include a bus 202, a processor 204, a main memory 206, a read only memory (ROM) 208, a storage device 210, an input device 212, an output device 214, and a communication interface 216. Bus 202 may include a path that permits communication among the components of computing device 108.

Processor 204 may include any type of conventional processor, microprocessor, or processing logic that interprets and executes instructions. Main memory 206 may include a random access memory (RAM) or another type of dynamic storage device that stores information and instructions for execution by processor 204. ROM 208 may include a conventional ROM device or another type of static storage device that stores static information and instructions for use by processor 204. Storage device 210 may include a magnetic and/or optical recording medium and its corresponding drive.

Input device 212 may include a conventional mechanism that permits computing device 108 to receive commands, instructions, or other inputs from a user 150, 152, or 154, including visual, audio, touch, button presses, stylus taps, etc. Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 108 to communicate with other devices and/or systems. For example, communication interface 216 may include mechanisms for communicating with another device or system via a network, such as network 110 (FIG. 1).

As described herein, computing device 108 facilitates the presentation of publications from one or more publishers, along with one or more content items to a user. Computing device 108 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software.

Figure 3:
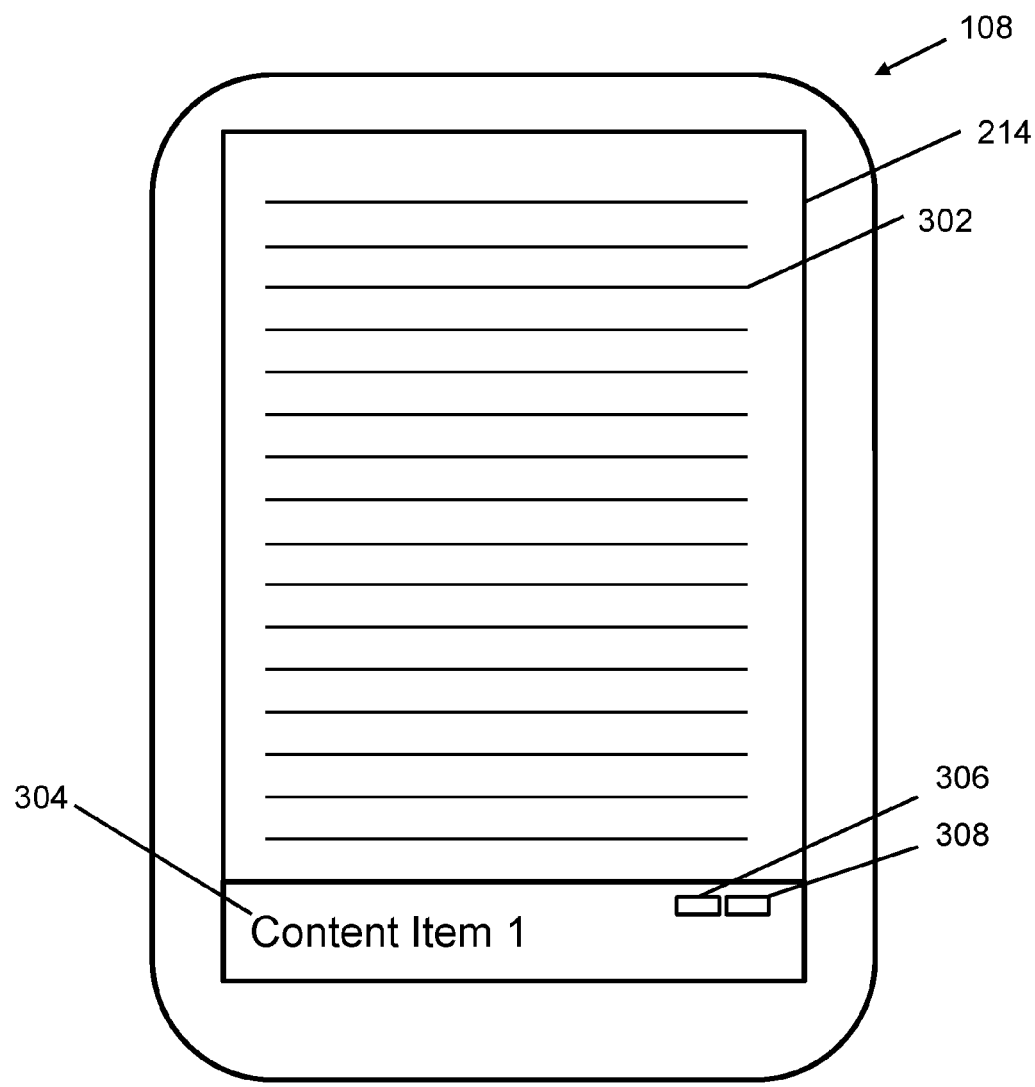
FIG. 3 is an example computing device displaying a publication and a content item.

FIG. 3 is an example computing device 108 displaying a first publication 302 and a content item (i.e., a single unit of content) 304. That is, computing device 108, which in this example is a smart phone, is displaying, through output device 214, which is a touch screen, an article 302 displayed in a software application ("application") executing on computing device 108. For purposes of this description, the article 302 is a "first publication". Shown in conjunction with the article 302 is content item 304, which occupies a small portion of the touch screen 214. If content item 304 is clicked or tapped by user 154, computing device 108 visits a web page or otherwise retrieves and displays linked content that occupies the entire touch screen 214. The content item 304 includes a section 306 that, if clicked or tapped on by user 154, causes computing device 108 to remove the content item 304 from the touch screen 214 and generate and store an indicator in main memory 206, storage device 210, and/or database 146 (FIG. 1) that the content item 304 has been designated for subsequent review.

The indicator includes identifying information of the content item 304, in addition to an identification of the user 154, the computing device 108, the first publication 302, the software application or web page associated with the first publication 302, the subject matter of the first publication 302, the time the first publication 302 was displayed to the user 154, the time the content item 304 was displayed to the user 154, and/or the time the user designated the content item 304 for subsequent review. That is, if user 154 is interested in viewing the content item 304 and linked content associated with the content item 304 at a later time, but would like to continue viewing the first publication 302, then by clicking or tapping section 306, user 154 is able to designate the content item 304 for subsequent review. With the content item 304 removed from the touch screen 214, user 154 continues to view the first publication 302. In other implementations, a particular gesture, voice command, or other input from user 154 causes computing device 108 to carry out the above function. Additionally, if user 154 is simply not interested in the content item 304, user 154 may dismiss the content item 304 altogether by clicking or tapping section 308, which causes computing device 108 to remove the content item 304 from touch screen 214 without storing the above-discussed indicator.

Figure 4:
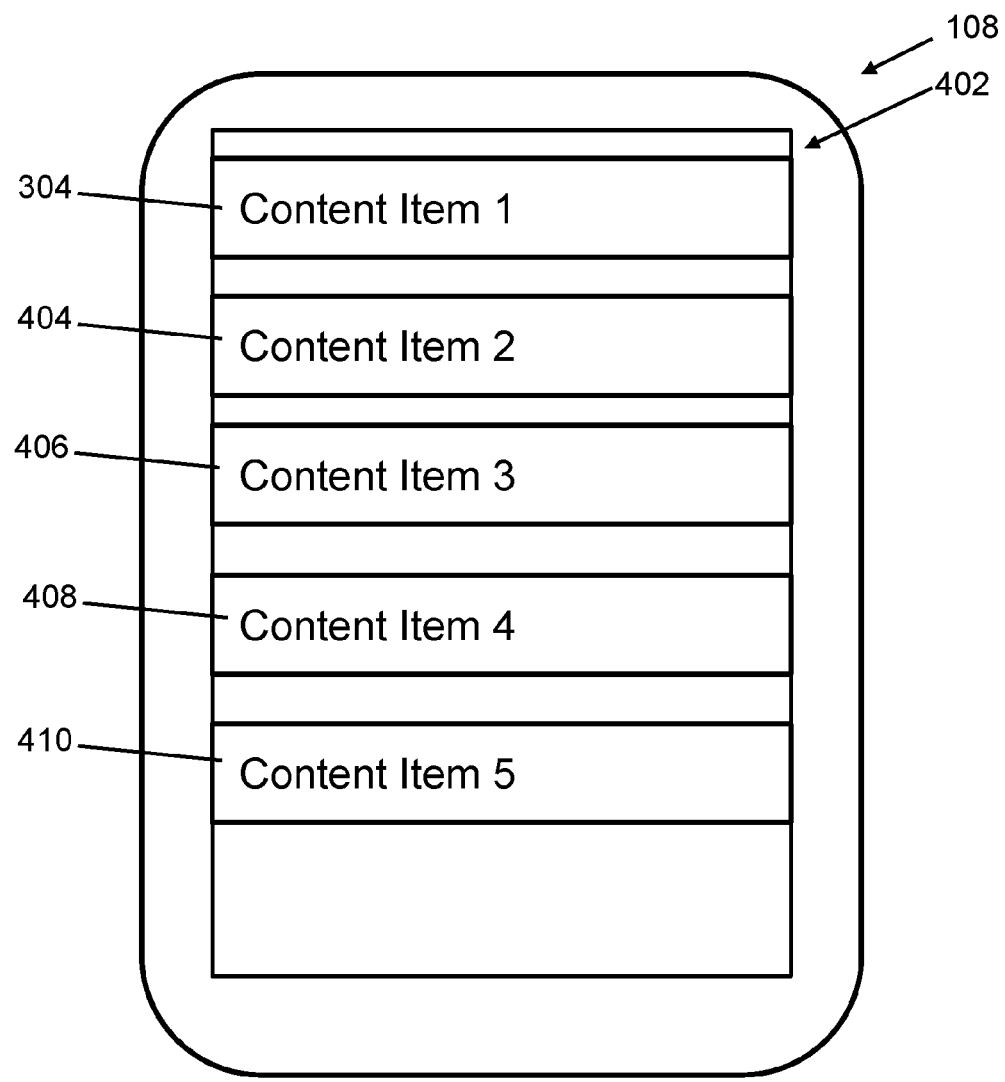
FIG. 4 is the example computing device of FIG. 3 displaying a list of content items designated for subsequent review.

FIG. 4 is the computing device 108 of FIG. 3 displaying a list 402 of content items designated for subsequent review. That is, computing device 108, upon receiving an input from user 154 to close the first publication 302 (FIG. 3), for example by providing an input to close a software application or a web browser responsible for displaying the first publication 302 (FIG. 3), computing device 108 displays a list 402 of content items 304, 404, 406, 408, and 410, that user 154 has designated for subsequent review. In the discussion of FIG. 3, one particular content item 304 is described. However, user 154 was presented with other content items at other times as well. By clicking or tapping on any of content items 304, 404, 406, 408, and 410, user 154 is presented with the linked content associated with the content items 304, 404, 406, 408, and 410. Accordingly, though user 154 may have forgotten that he or she was interested in investigating particular content, by presenting list 402 to user 154, user 154 is reminded of his or her interest in the listed content items 304, 404, 406, 408, and 410 and is able to review one or more of them, and the associated linked content at this time. In other implementations, rather than displaying list 108 upon user 154 closing the first publication 302, computing device 108 displays list 402 upon an input from user 154, such as a query to display the list 402.

In other implementations, a specific application (i.e., a set of computer-executable instructions) is stored in main memory 206 or storage device 210 for displaying content items that user 154 has previously designated for subsequent review. In such implementations, the specific application causes computing device 108 to display a list of content items similar to list 402 when user 154 causes the specific application to be executed on computing device 108. In yet other implementations, when user 154 accesses a gallery of photographs or other images stored on computing device 108, computing device 108 executes a set of computer-executable instructions that cause one or more screen shots or images of one or more of content items 304, 404, 406, 408, and 410 and/or other content items previously designated by user 154 for subsequent review to be displayed in the gallery as a reminder to user 154 of his or her interest in the content items.

In yet other implementations, computer-executable instructions stored in main memory 206 or storage device 210, when executed by computing device 108, cause one or more of content items 304, 404, 406, 408, and 410, other content items that user 154 has previously designated for subsequent review, and/or related content items to appear as a notification in an area (a "notifications tray") of touch screen 214 used by computing device 108 to display other notifications relating to other applications or processes (e.g., a clock, a calendar, a battery monitor, and/or a network signal monitor) executing on computing device 108. In yet other implementations, computing device 108 executes computer-executable instructions that cause one or more of content items 304, 404, 406, 408, and 410, other content items designated for subsequent review, and/or related content items, to appear in the application that originally displayed the content item or in another application, in a manner similar to FIG. 3 at a subsequent time. The subsequent time is determined based on one or more of an elapsed time since the content item 304, 404, 406, 408, or 410 was last displayed to user 154, the subject matter of a publication being displayed by the application, the subject matter of the content item 304, 404, 406, 408, or 410, and/or any other information stored in connection with the indicator described above in association with FIG. 3.

Figure 5:
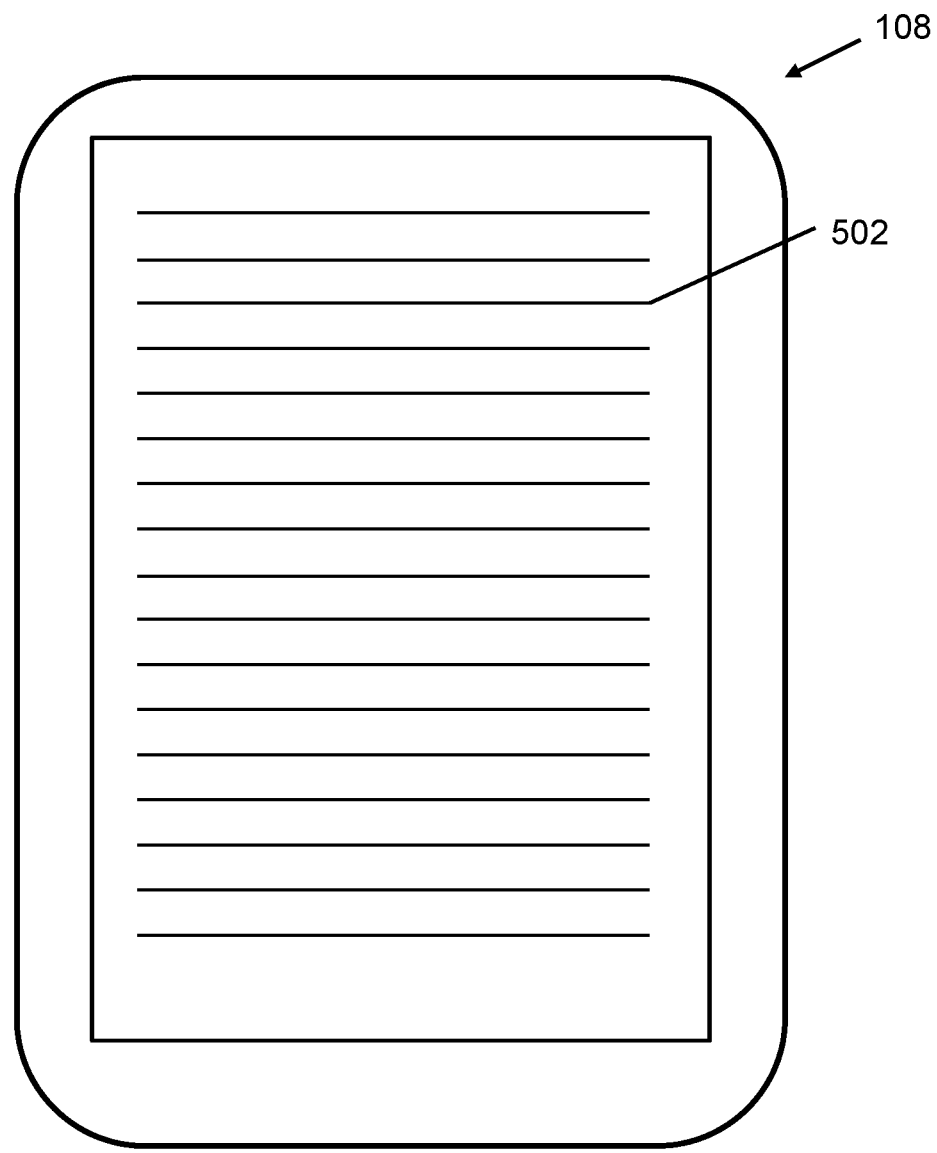
FIG. 5 is the example computing device of FIG. 3 displaying linked content associated with a content item designated for subsequent review.

FIG. 5 shows the computing device 108 of FIG. 3 displaying linked content 502 associated with a content item designated for subsequent review. That is, for example, if user 154 clicked or tapped on content item 304 (FIG. 3), computing device 108 would display the linked content 502 as shown in FIG. 5.

Figure 6:
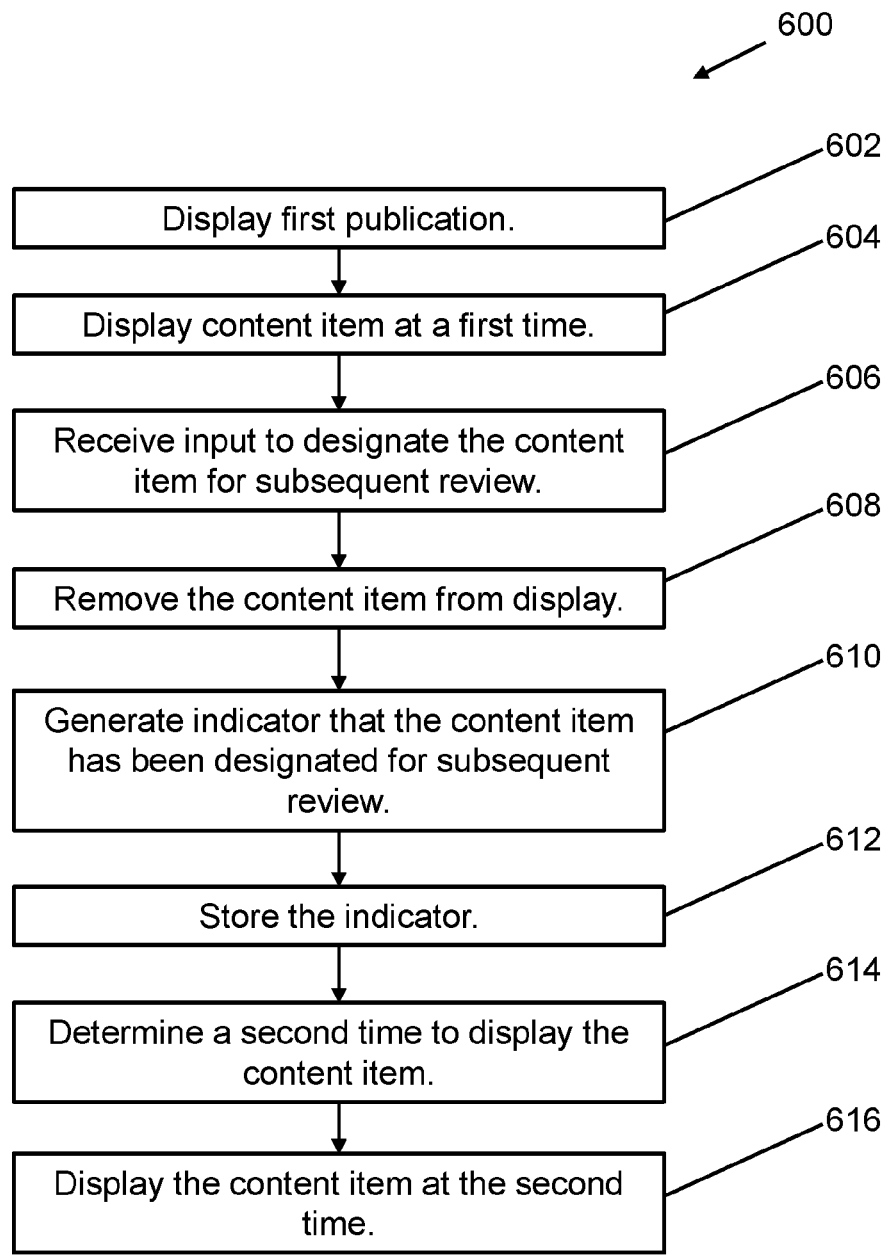
FIG. 6 is an example method of designating a content item for subsequent review.

FIG. 6 is a flowchart of an example method 600 of designating a content item for subsequent review. The method may be implemented by computing device 108 of FIG. 3. At step 602, computing device 108 displays first publication 302 (FIG. 3). As described above, first publication 302 might be, for example, an article displayed in a web page or in a software application running on computing device 108. At step 604, computing device 108 displays content item 304 (FIG. 3) as described in connection with FIG. 3. The content item 304 is displayed 604 at a first time. At step 606, computing device 108 receives an input to designate the content item 304 for subsequent review. As discussed above, the input may be, for example, a click or tap on section 306 of content item 304, a swipe or other gesture, or a voice command. At step 608, computing device 108 removes the content item 304 from the touch screen 214. At step 610, computing device 108 generates an indicator that the content item 304 has been designated for subsequent review, as discussed in connection with FIG. 3. At step 612, computing device 108 stores the indicator in main memory 206 (FIG. 2), storage device 210 (FIG. 2), and/or causes the indicator to be stored in general database 146 of CMS 106 (FIG. 1). At step 614, computing device 108 determines a second time to display the content item 304 and at step 616, computing device 108 displays the content item 304 at the second time.

Figure 7:
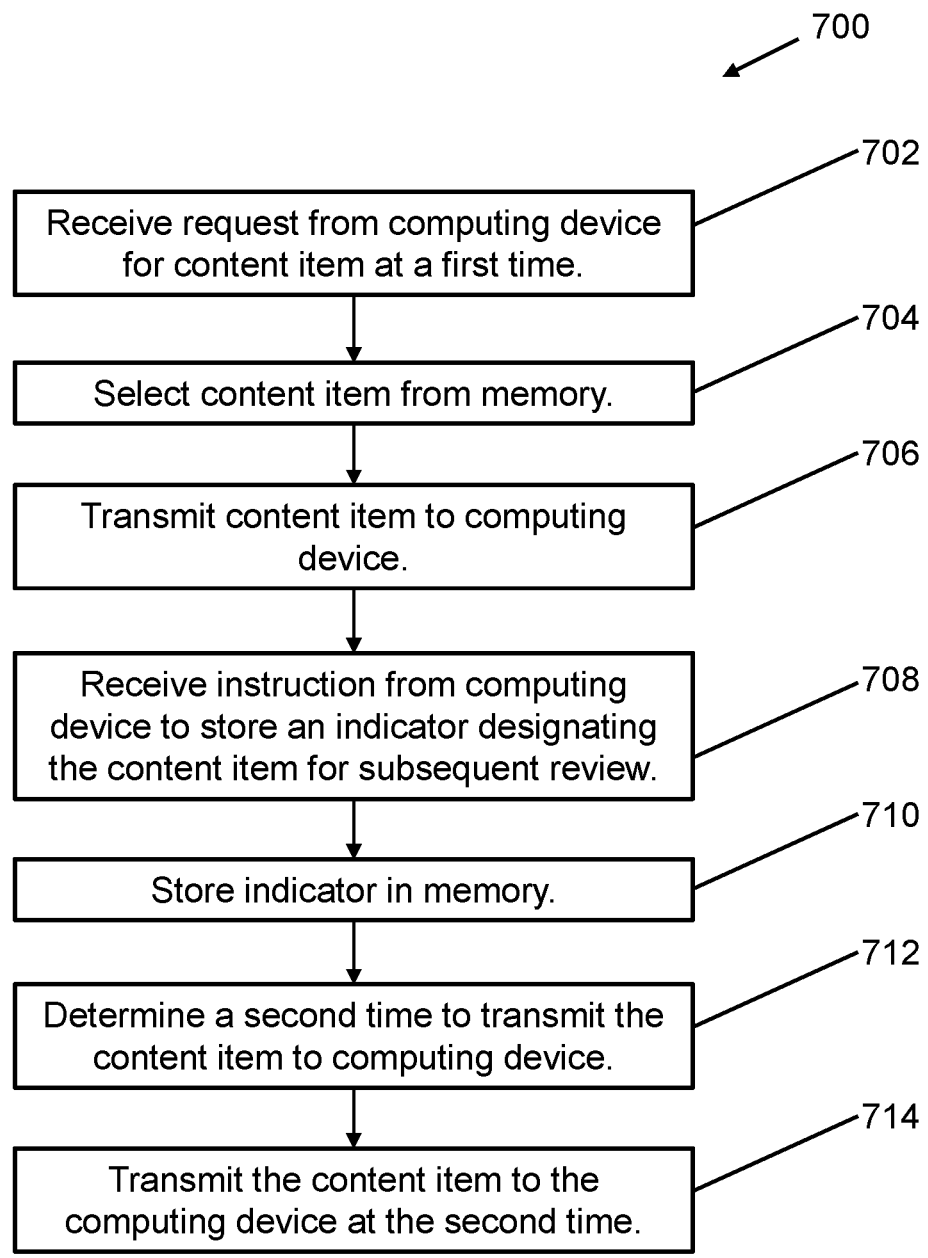
FIG. 7 is an example method of facilitating the method of FIG. 6 using at least one computing device communicatively coupled to the computing device of FIG. 3.

FIG. 7 is a flowchart of an example method 700 of facilitating the method 600 of FIG. 6 using at least one computing device communicatively coupled to computing device 108 of FIG. 3. In method 700, the at least one computing device is, for example, one or more data processing systems 116 of backend systems 118 and content serving system 120 of CMS 106. At step 702, data processing systems 116 receive a request for a content item at a first time. The request is received from computing device 108 (FIG. 3). At step 704, data processing systems 116 select content item 304 from content repository 126, using information stored in content repository 126 and general database 146. At step 706, data processing systems 116 transmit the content item 304 to computing device 108. At step 708, data processing systems 116 receive an instruction from computing device 108 to store an indicator designating the content item 304 for subsequent review. At step 710, data processing systems 116 store the indicator in general database 146. At step 712, data processing systems 116 determine a second time to transmit the content item 304 to computing device 108, and at step 714, data processing systems 116 transmit the content item 304 to computing device 108. It should be understood that communications between data processing systems 116 and computing device 108 take place through network 110, as described with reference to FIG. 1.

Figure 8:
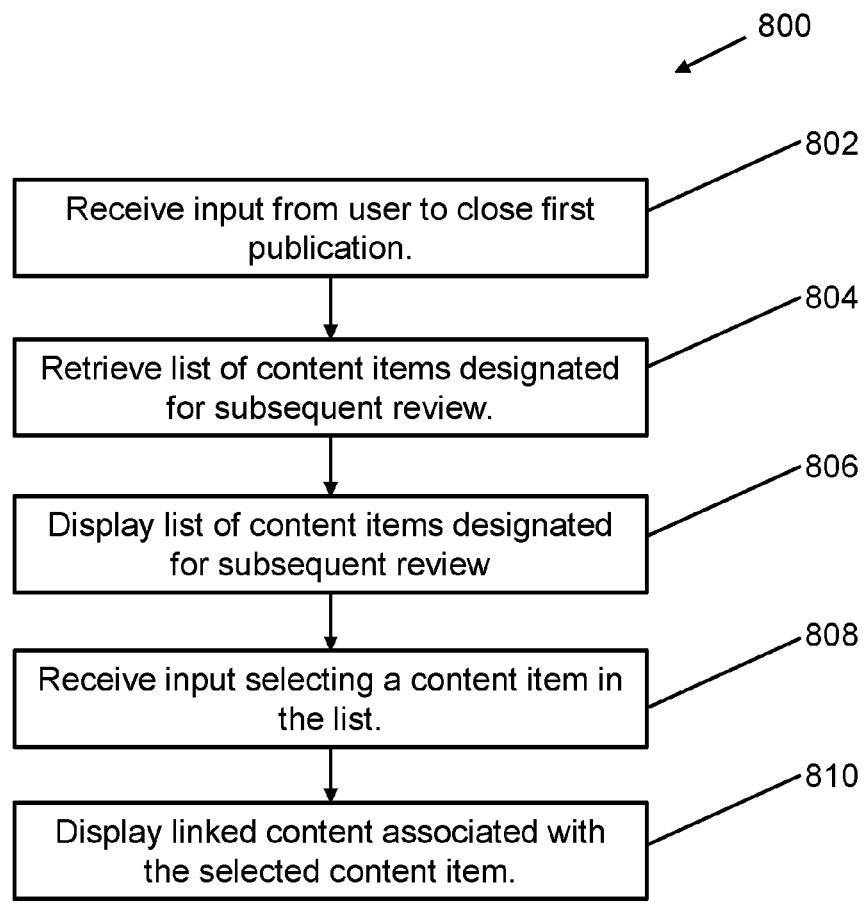
FIG. 8 is an example method of reminding a user of content items designated for subsequent review.

FIG. 8 is a flowchart of an example method 800 of reminding user 154 of content items designated for subsequent review. The method 800 may be carried out by computing device 108 of FIG. 3. The steps of method 800 correspond to a particular implementation of steps 614 and 616 of FIG. 6. At step 802, computing device 108 receives an input from user 154 to close the first publication. In other implementations, computing device 108 instead receives an input from user 154 querying computing device 108 for a list of content items that have been designated for subsequent review. At step 804, computing device 108 retrieves, from main memory 206, storage device 210, or general database 146 of CMS 106 a list of content items designated for subsequent review by user 154. At step 806, computing device displays the list of content items designated for subsequent review, for example as list 402 (FIG. 4). At step 808, computing device 108 receives an input from user 154 selecting one of the content items from the list. At step 810, computing device 108 displays the corresponding linked content associated with the selected content item, for example as shown and discussed with reference to FIG. 5.

As described above, in other implementations, rather than performing steps 804-810 after receiving input from user 154 to close first publication, computing device 108 performs steps 804-810 in response to user 154 executing a specific application on computing device 108 for displaying content items designated for subsequent review.

Figure 9:
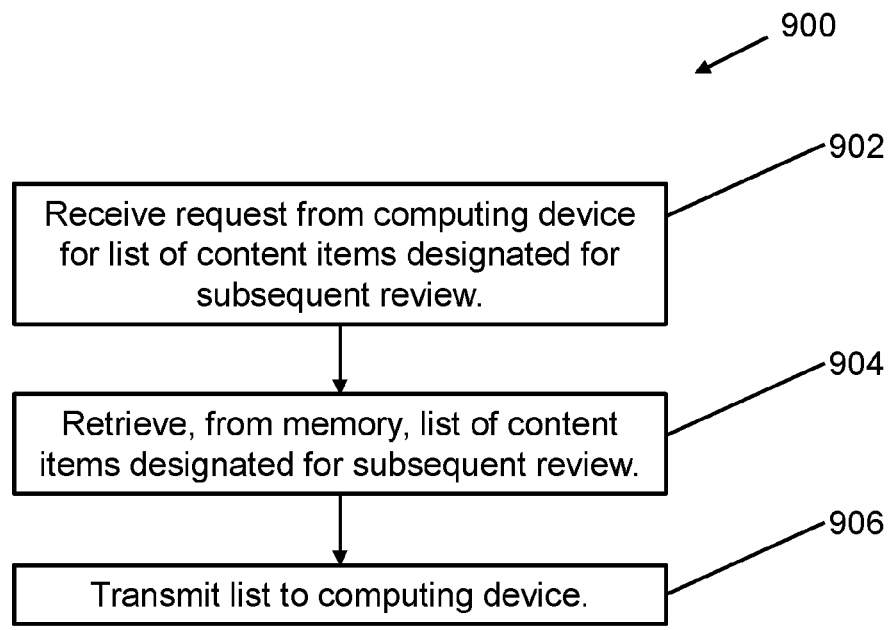
FIG. 9 is an example method of facilitating the method of FIG. 8 using at least one computing device communicatively coupled to the computing device of FIG. 3.

FIG. 9 is a flowchart of an example method 900 of facilitating the method 800 of FIG. 8 using at least one computing device communicatively coupled to computing device 108 of FIG. 3. The steps of method 900 correspond to a particular implementation of steps 712 and 714 of FIG.

7. As with method 700, the at least one computing device communicatively coupled to computing device 108 is, for example, data processing systems 116 (FIG. 1). At step 902, data processing systems 116 receive a request from computing device 108 for a list of content items designated by user 154 for subsequent review. At step 904, data processing systems 116 retrieve the list of content items designated for subsequent review from general database 146. That is, data processing systems 116 retrieve, from general database 146, one or more indicators, such as the indicator stored in step 710 of FIG. 7, from general database 146 along with the associated content item for each list item. At step 906, data processing systems 116 transmit or send the list of content items to computing device 108. As explained with reference to FIG. 7, communication between computing device 108 and data processing systems 116 of CMS 106 occur, for example, through network 110.

Figure 10:
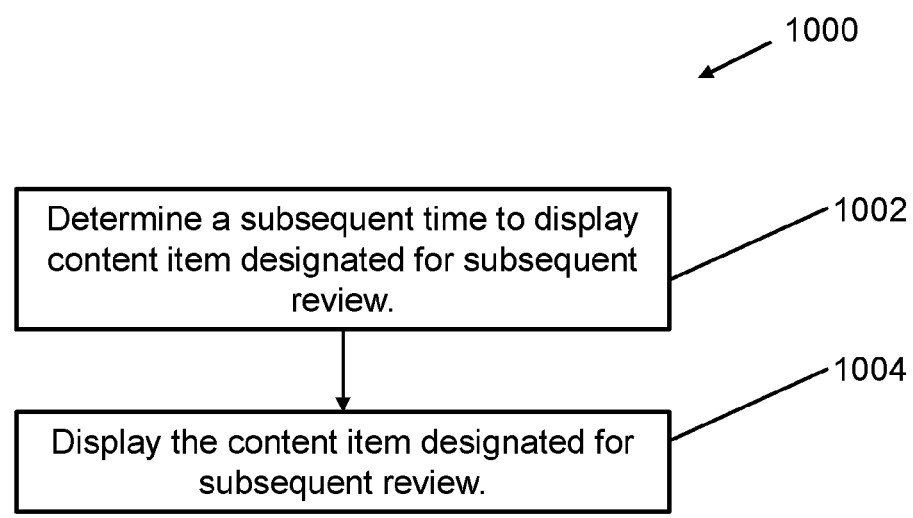
FIG. 10 is an example method of displaying a content item that was previously designated for subsequent review.

FIG. 10 is a flowchart of an example method 1000 of displaying a content item that was previously designated for subsequent review. Method 1000 may be carried out by the computing device 108 of FIG. 3. The steps of method 1000 correspond to certain implementations of steps 614 and 616 of FIG. 6. At step 1002, computing device 108 determines a subsequent time to display the content item 304 (FIG. 3) designated by user 154 for subsequent review. Step 1002 may occur, for example, immediately after step 606 of FIG. 6. In other implementations, step 1002 may occur at a different time, based on at least one of an elapsed time between the first time the content item 304 was displayed and the subsequent time, a subject matter of the content item 304, a subject matter of the first publication that the content item 304 was previously displayed in conjunction with, information pertaining to a publisher 104 of the first publication, a subject matter of a second publication being displayed by the computing device 108 at the subsequent time, an interest of user 154, a location of user 154, and/or other information about user 154 that is stored in a profile, location information associated with the content item 304, and a number of times that the content item 304 has been designated for subsequent review by user 154.

At step 1004, computing device 108 displays the content item 304 designated for subsequent review. In some implementations, the content item 304 is displayed in a notifications tray by computing device 108. In other implementations, an image or screenshot of the content item 304 is displayed in a gallery of images stored on computing device 108. In other implementations, the content item 304 is displayed in an application other than an application that originally displayed the content item 304. In implementations where computing device 108 locally stores (e.g. in main memory 206 or storage device 210, rather than content repository 126 and/or general database 146) content items and/or one or more indicators for subsequent review of content items, computing device 108 retrieves the content item 304 from main memory 206 or storage device 210, rather than requesting it from data processing systems 116. In other implementations, method 1100 of FIG. 11 is performed, as described below.

Figure 11:
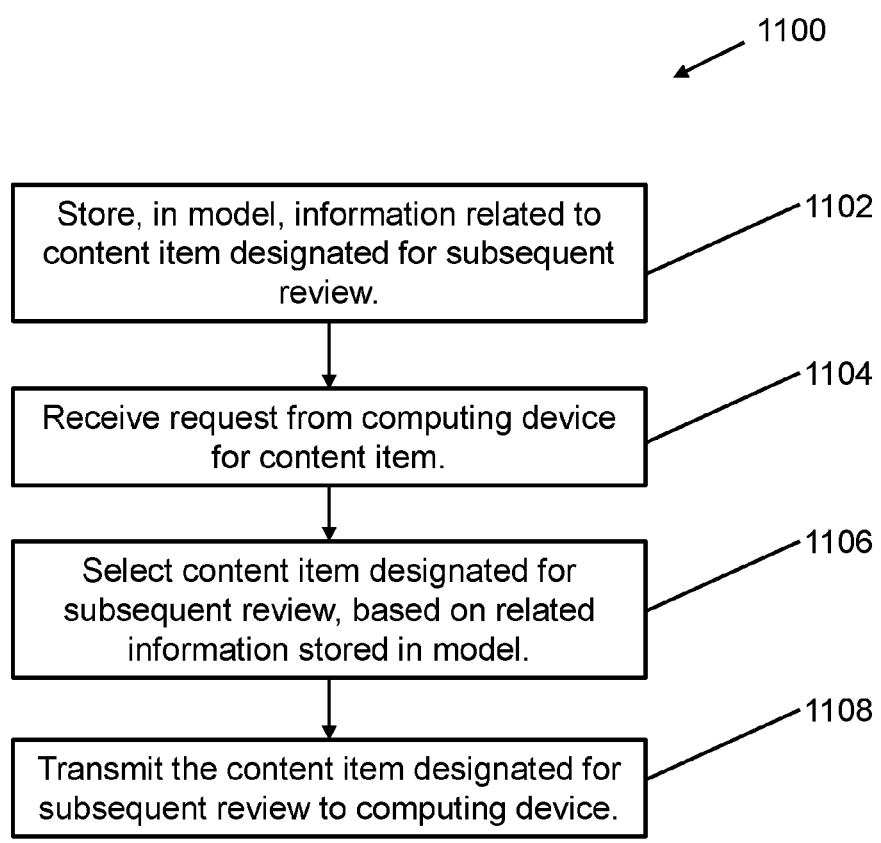
FIG. 11 is a flowchart of an example method of enabling the computing device of FIG. 3 to display a content item that was previously designated for subsequent review.

FIG. 11 is a flowchart of an example method 1100 of enabling computing device 108 to display a content item that was previously designated by user 154 for subsequent review. The steps of method 1100 correspond to particular implementations of steps 712 and 714 of FIG. 7. Method 1100 is carried out by one or more computing devices coupled to computing device 108 of FIG. 3. For example, method 1100 is carried out by data processing systems 116 of CMS 106 (FIG. 1). Method 1100 is performed after at least one indicator has been stored in general database 146, in accordance with step 710 of FIG. 7. At step 1102, data processing systems 116 store information pertaining to one or more content items designated by user 154 for subsequent review in a model for determining an optimal time to re-present or remind user 154 with a content item that was previously designated for subsequent review.

The aforementioned model may be embodied in data stored in one or more of content repository 126, conversion data repository 136, general database 146 and/or in computer-executable instructions stored in any of the elements of CMS 106. In other implementations, all or portions of the model are included in main memory 206 or storage device 210 of computing device 108. The information stored at step 1102 may include the content item designated for subsequent review, categories of subject matter, for example types of goods or services associated with the content item, the publisher 104 of the first publication that the content item was displayed in conjunction with, when the content item was last displayed to user 154, when user 154 designated the content item for subsequent review, location information pertaining to the first publication, the content item, and/or user 154, the number of times user 154 has designated the content item for subsequent review, when user 154 was last presented with the content item, and interests and other profile data of user 154.

At step 1104, data processing systems 116 receive a request from computing device 108 for a content item. At step 1106, using the above-mentioned model, data processing systems 116 select the content item designated by user for subsequent review. For example, the content item may be content item 304 (FIG. 3). At step 1108, data processing systems 1106 transmit or send the content item 304 to computing device 108. It should be understood that data processing systems 116, in accordance with the above-described method, may cause content item 304 to be transmitted to computing device 108 when user 154 is viewing a publication other than first publication 302 (FIG. 3). That is, it is likely that user 154 will be viewing a different publication, either on a different web page or in a different software application than when user 154 originally designated the content item 304 for subsequent review. Additionally, in some implementations, if user 154 designates the content item 304 for subsequent review on multiple occasions, the above-mentioned model will increase the likelihood that computing device 108 will display the content item 304 over other content items. Further, the above-discussed model may, over time, decrease the likelihood that a particular content item is presented to user 154 if the user's behavior indicates that the user's interest is shifting away from the subject matter of the particular content item.

Figure 12:
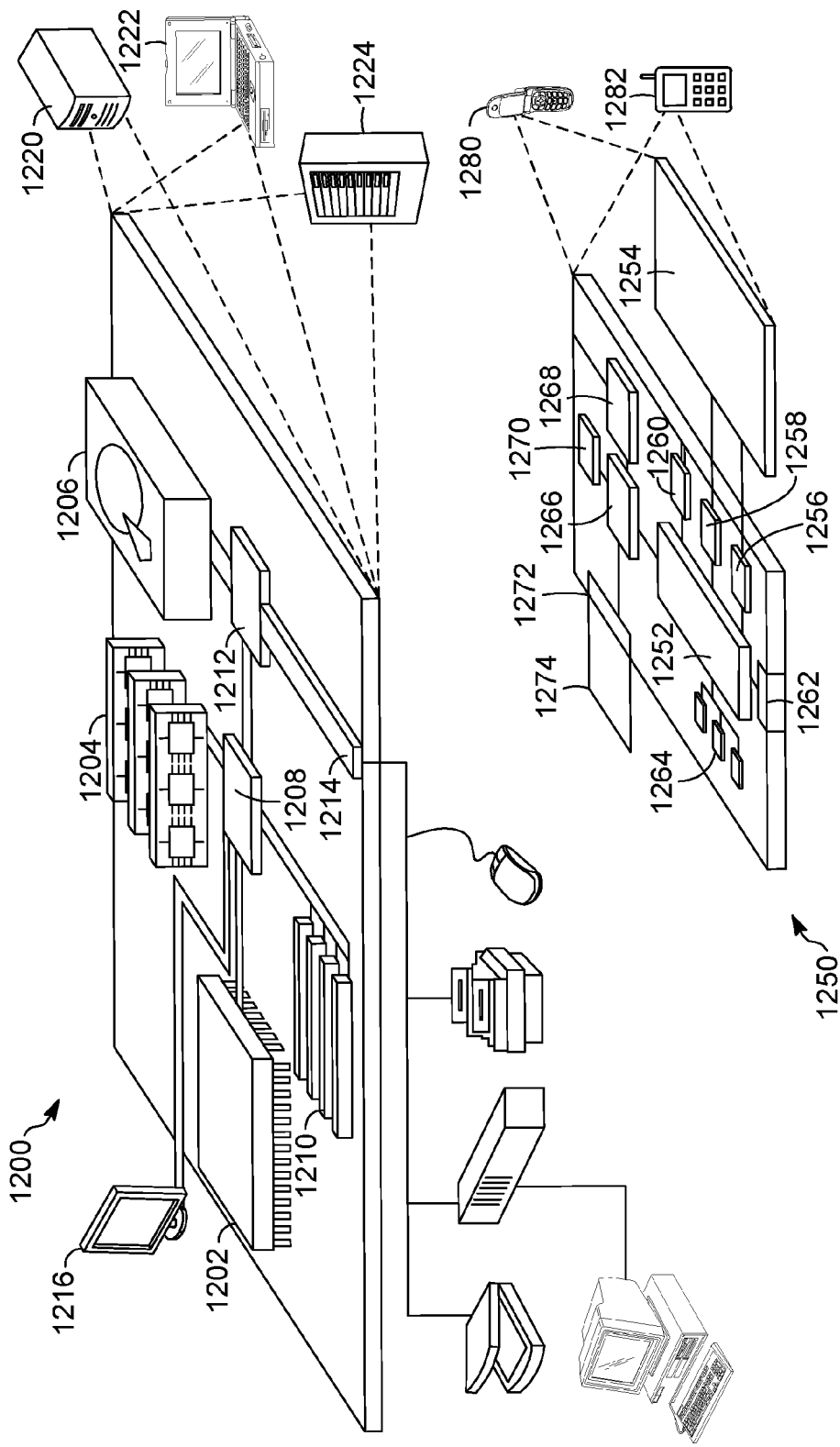
FIG. 12 is a diagram of example computing devices that may be used in the environment shown in FIG. 1.

FIG. 12 is a diagram of example computing devices 1200 and 1250 that may be used in the environment shown in FIG. 1. More specifically, FIG. 12 shows an example of a generic computing device 1200 and a generic mobile computing device 1250, which may be used with the techniques described here. Computing device 1200 is intended to represent various forms of digital computers, such as laptops, desktops, workstations, personal digital assistants, servers, blade servers, mainframes, and other appropriate computers. Computing device 1250 is intended to represent various forms of mobile devices, such as personal digital assistants, cellular telephones, smart phones, and other similar computing devices. The components shown here, their connections and relationships, and their functions, are meant to be examples only, and are not meant to limit implementations of the subject matter described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk.

The storage device 1206 is capable of providing mass storage for the computing device 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1204, the storage device 1206, or memory on processor 1202.

The high speed controller 1208 manages bandwidth-intensive operations for the computing device 1200, while the low speed controller 1212 manages lower bandwidth-intensive operations. Such allocation of functions is for purposes of example only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 500 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as chips that include separate and multiple analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD (Thin-Film-Transistor Liquid Crystal Display) or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be in communication with processor 1252, so as to enable near area communication of device 1250 with other devices. External interface 1262 may provide, for example, for wired communication in some implementations, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In Line Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provided as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252 that may be received, for example, over transceiver 1268 or external interface 1262.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, WiFi, or other such transceiver (not shown). In addition, GPS (Global Positioning system) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smart phone 1282, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing systems 1200 and 1250 are configured to receive and display publications and content items from various other computing devices connected to computing devices 1200 and 1250 through a communication network, allow a user to designate a content item for subsequent review, and display the content item to the user at subsequent times. Computing systems 1200 and 1250 are further configured to manage and organize data associated with carrying out the above-described functions within at least one of memory 1204, storage device 1206, and memory 1264 using the techniques described herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the subject matter described herein or its features may have different names, formats, or protocols. Further, the system may be implemented via a combination of hardware and software, as described, or entirely in hardware elements. Also, the particular division of functionality between the various system components described herein is merely for the purposes of example only, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A method comprising:
   displaying, by a computing device, a content item at a first time in conjunction with a first publication;
   receiving, from an input device of the computing device, a first input indicative of designating the content item for subsequent review;
   generating, by the computing device, an indicator that the content item has been designated for subsequent review, the indicator comprising an identification of the content item and a subject matter of the first publication;
   storing the indicator in a memory device of the computing device;
   matching, by the computing device, the subject matter of the first publication retrieved from the stored indicator to a subject matter of a second publication;
   determining, by the computing device, a second time to display the content item responsive to the matching;
   displaying, by the computing device, the content item at the second time with the second publication.

2. The method of claim 1, further comprising:
   sending a request, by the computing device, for the content item responsive to determining the second time to display the content comprising the identification of the content item; and
   receiving the content item, by the computing device, responsive to the request.

3. The method of claim 1, further comprising:
   receiving, by the input device, a second input indicative of a request to display a list of content items designated for subsequent review; and
   retrieving, from the memory device, the content item designated for subsequent review.

4. The method of claim 3, further comprising: closing, by the computing device, an application or web page displaying the first publication responsive to receiving the second input indicative of the request to display the list of content items designated for subsequent review.

5. The method of claim 1, further comprising:
   receiving, by the input device, a selection input selecting the content item; and
   displaying, by the computing device, linked content associated with the selected content item.

6. The method of claim 1, further comprising:
   generating, by the computing device, a first request for the content item;
   transmitting, by the computing device, the first request to a second computing device; and
   receiving, by the computing device, the content item from the second computing device.

7. The method of claim 1, the determining the second time to display the content item further based on at least one of an elapsed time between the first time and the second time, information pertaining to a publisher of the first publication, an interest stored in a user profile, a location stored in a user profile, location information associated with the content item, and a number of times that the content item has been designated for subsequent review.

8. The method of claim 1, further comprising displaying, by the computing device, the content item at the first time in a first application and displaying the content item at the second time with the second publication further comprises displaying the content item in at least one of a gallery of images, a notifications tray, and a second application that is different from the first application.

9. A computing device comprising one or more processors, a memory device coupled to the one or more processors, a display coupled to the one or more processors, an input device coupled to the one or more processors, and data storage coupled to the one or more processors, the data storage contains processor-executable instructions that, when executed by the one or more processors cause the computing device to perform the steps:
   displaying, on the display, a content item at a first time in conjunction with a first publication;
   receiving, from the input device, a first input indicative of designating the content item for subsequent review;
   generating an indicator that the content item has been designated for subsequent review, the indicator comprising an identification of the content item and a subject matter of the first publication;
   storing the indicator in the data storage;
   matching the subject matter of the first publication retrieved from the stored indicator to a subject matter of a second publication;
   determining a second time to display the content item responsive to the matching;
   displaying, on the display, the content item at the second time with the second publication.

10. The computing device of claim 9, further comprising instructions that, when executed by the one or more processors cause the computing device to perform the steps:

sending a request for the content item responsive to determining the second time to display the content comprising the identification of the content item; and receiving the content item responsive to the request.

11. The computing device of claim 9, further comprising instructions that, when executed by the one or more processors cause the computing device to perform the steps:

receiving, from the input device, a second input indicative of a request to display a list of content items designated for subsequent review; and retrieving, from the data storage, the content item designated for subsequent review.

12. The computing device of claim 9, further comprising instructions that, when executed by the one or more processors cause the computing device to perform closing, an application or web page displaying the first publication responsive to receiving the second input indicative of the request to display the list of content items designated for subsequent review.

13. The computing device of claim 9, further comprising instructions that, when executed by the one or more processors cause the computing device to perform the steps:

receiving, from the input device, a selection input selecting the content item; and displaying, on the display, linked content associated with the selected content item.

14. The computing device of claim 9, further comprising instructions that, when executed by the one or more processors cause the computing device to perform the steps:

generating a first request for the content item;

transmitting the first request to a second computing device; and receiving the content item from the second computing device.

15. The computing device of claim 9, further comprising instructions that, when executed by the one or more processors cause the computing device to perform the steps: the determining the second time to display the content item further based on at least one of an elapsed time between the first time and the second time, information pertaining to a publisher of the first publication, an interest stored in a user profile, a location stored in a user profile, location information associated with the content item, and a number of times that the content item has been designated for subsequent review.

16. The computing device of claim 9, further comprising instructions that, when executed by the one or more processors cause the computing device to perform the steps: displaying the content item at the first time in a first application and displaying the content item at the second time with the second publication further comprises displaying the content item in at least one of a gallery of images, a notifications tray, and a second application that is different from the first application.

17. A non-transitory computer-readable storage device having instructions that cause a computing device executing the instructions to perform the steps:

displaying, by the computing device, a content item at a first time in conjunction with a first publication;

receiving, from an input device of the computing device, a first input indicative of designating the content item for subsequent review;

generating, by the computing device, an indicator that the content item has been designated for subsequent review, the indicator comprising an identification of the content item and a subject matter of the first publication;

storing the indicator in a memory device of the computing device;

matching, by the computing device, the subject matter of the first publication retrieved from the stored indicator to a subject matter of a second publication;

determining, by the computing device, a second time to display the content item responsive to the matching;

displaying, by the computing device, the content item at the second time with the second publication.

18. The non-transitory computer-readable storage device of claim 17, further comprising instructions to perform the steps:

sending a request, by the computing device, for the content item responsive to determining the second time to display the content comprising the identification of the content item; and receiving the content item, by the computing device, responsive to the request.

19. The non-transitory computer-readable storage device of claim 17, further comprising instructions to perform the steps:

receiving, by the input device, a second input indicative of a request to display a list of content items designated for subsequent review; and retrieving, from the memory device, the content item designated for subsequent review.

20. The non-transitory computer-readable storage device of claim 17, further comprising instructions to perform the steps: closing, by the computing device, an application or web page displaying the first publication responsive to receiving the second input indicative of the request to display the list of content items designated for subsequent review.

* * * * *